United States Patent [19]
Johnson et al.

[11] Patent Number: 4,688,912
[45] Date of Patent: Aug. 25, 1987

[54] PHOTOGRAPHIC APPARATUS HAVING A FILM ADVANCING AND PROCESSING ASSEMBLY

[75] Inventors: Bruce K. Johnson, Andover; George D. Whiteside, Lexington, both of Mass.

[73] Assignee: Polaroid Corporation, Cambridge, Mass.

[21] Appl. No.: 932,645

[22] Filed: Nov. 20, 1986

[51] Int. Cl.⁴ ............................................. G03B 17/50
[52] U.S. Cl. ...................................... 354/86; 354/212
[58] Field of Search ...................... 354/84, 85, 86, 212

[56] References Cited

U.S. PATENT DOCUMENTS

| 3,405,619 | 10/1968 | Land | 354/84 |
|---|---|---|---|
| 3,426,664 | 2/1969 | Norton | 354/86 |
| 3,537,370 | 11/1970 | Wareham | 354/86 |
| 3,576,626 | 4/1971 | Milligan et al. | 430/212 |
| 3,653,308 | 4/1972 | Erlichman | 354/86 |
| 3,683,771 | 8/1972 | Land | 354/86 |
| 3,687,032 | 8/1972 | Erlichman | 354/86 |
| 4,090,211 | 5/1978 | Oishi et al. | 354/86 |
| 4,126,875 | 11/1978 | Wareham | 354/86 |
| 4,592,633 | 6/1986 | Seki et al. | 354/76 |

Primary Examiner—Alan Mathews
Attorney, Agent, or Firm—Alfred E. Corrigan

[57] ABSTRACT

Photographic apparatus for moving an exposed film unit of the instant type from a film cassette and through an arcuate passageway which changes its path of movement from a first direction to a second direction, the apparatus including a roller assembly which moves the exposed film unit into the arcuate passageway and withdraws it from the same, the roller assembly also functioning to spread a processing liquid across a layer of the exposed film unit to initiate the formation of a visible image therein.

16 Claims, 4 Drawing Figures

PHOTOGRAPHIC APPARATUS HAVING A FILM ADVANCING AND PROCESSING ASSEMBLY

RELATED APPLICATIONS

This application is related to our copending applications Ser. No. 866,066 filed May 20, 1986, entitled "Compact Folding Camera Construction" and to application Ser. No. 881,269 filed July 2, 1986, entitled "Camera Having Chamber For Storing Exposed Film Units During Their Development", both applications being assigned in common herewith.

BACKGROUND OF THE INVENTION

The present invention relates to a photographic apparatus for use with film units of the instant or self-developing type, and more particularly to an apparatus having means for moving an exposed film unit in a first direction from a film cassette and redirecting the exposed film into a generally opposite second direction, which leads to a film storage chamber. During this movement of the exposed film unit a processing liquid is spread across a layer of the exposed film unit to initiate the formation of a visible image therein by a diffusion transfer process. The exposed film unit is directed along an arcuate path which forces the film unit into a curved configuration as it changes direction thus keeping the size of the apparatus to a minimum.

Generally speaking, the concept of bending or curving an exposed film unit so as to change its direction of movement away from a film cassette and toward a storage chamber is well known, as evidenced by the teachings of U.S. Pat. Nos. 3,405,619 and 3,426,664. However, the camera disclosed in the former patent requires a separate air tight chamber which houses a roll of liquid impregnated sheet material, which sheet material must be laminated with the exposed film unit to initiate the formation of a visible image within the film unit. Thus, any savings in space which may occur because of the bending of the film unit is compromised by the space taken up by the airtight chamber. As regard the camera disclosed in the latter patent, a rather complicated and expensive belt system is required to carry or move the exposed film unit from its cassette to the camera's film storage chamber. Further, the speed of movement of the belt system must be synchronized with the camera's exposure system to provide an acceptable image in the film unit.

SUMMARY OF THE INVENTION

The present invention relates to a self-developing or instant type photographic apparatus, e.g., a camera, having a lighttight imbibition or storage chamber in which an exposed film unit may remain until its latent image has been substantially transformed into a viewable image. The apparatus includes a housing enclosing a film chamber having structure for locating and supporting a film cassette containing a stack of film units in position for the sequential exposure of the film units. Located rearwardly or below the film cassette supporting structure is the storage chamber which is adapted to receive an exposed film unit, subsequent to a processing liquid being spread across a layer thereof, and maintain it in a lighttight environment until the processing liquid has sufficiently imbibed the film unit to cause the formation of a visible image. The apparatus includes a battery operated motor mounted adjacent one end of the film cassette supporting structure and means for advancing an exposed film unit from the film cassette, around the motor and then to the lighttight imbibition or storage chamber. The aformentioned means includes a first cantilevered member having a free end which is adapted to move an uppermost exposed film unit from the film cassette; laterally spaced cylindrically configured members such as friction wheels which are adapted to engage the lateral sides of the exposed film unit and in cooperation with an underlying elongate roller continue its movement away from the film cassette and into an arcuate passageway where it is bent around the motor and directed toward a pair of cylindrically configured superposed rollers, one of which is the aforementioned elongate roller; the superposed rollers; and a second cantilevered member for advancing the exposed film unit fully into the imbibition chamber. The rollers are adapted to rupture a container of processing liquid carried on a leading end of the advancing exposed film unit and spread its contents across a layer thereof to initiate the formation of a visible image therein by a diffusion transfer process. As the exposed film unit leaves the bite of the rollers, its trailing end is located in a position to be engaged by the second cantilevered member for subsequent movement into the imbibition chamber.

The apparatus further includes a loading door through which a film assemblage may be located on the aforementioned supporting structure. The loading door, which comprises one of the walls of the imbibition chamber, has a window therein through which the visible image in a film unit located within the imbibition chamber may be viewed without opening the loading door. Such window is ordinarily rendered lighttight by a blind which is movable from its operative position covering the window, to an inoperative position wherein the film unit within the chamber may be viewed. The blind is maintained in the operative position by a latch until the formation of a visible image within the last exposed unit to enter the imbibition chamber has been substantially formed. After the formation of the visible image, a timing circuit energizes a solenoid to move the latch to a position wherein the blind may be moved to its inoperative position.

The imbibition or storage chamber is also provided with a light sealed opening through which all of the film units located within the imbibition chamber may be moved as a unit to the exterior of the photographic apparatus. Suitable means, such as a manually actuatable slide, may be provided for such purpose.

An object of the invention is to provide photographic apparatus for use with instant type film units with means for moving an exposed film unit in a first direction, away from a film cassette, and then in a generally opposite second direction toward a storage chamber, the exposed film unit having a processing liquid spread across one of its layers during such movement from the film cassette to the storage chamber.

Another object of the invention is to provide photographic apparatus of the type described with an arcuate passageway for shortening the path of travel of an exposed film unit as it moves from a film cassette to a storage chamber located substantially immediately below the film cassette's supporting structure.

Still another object of the invention is to provide photographic apparatus of the type described with a roller assembly which moves an exposed film unit initially in a first direction and then in a second direction, the roller assembly also functioning to spread a processing liquid across a layer of the exposed film unit during its movement in one of the two directions.

Other objects of the invention will in part be obvious and will in part appear hereinafter.

The invention comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 4:
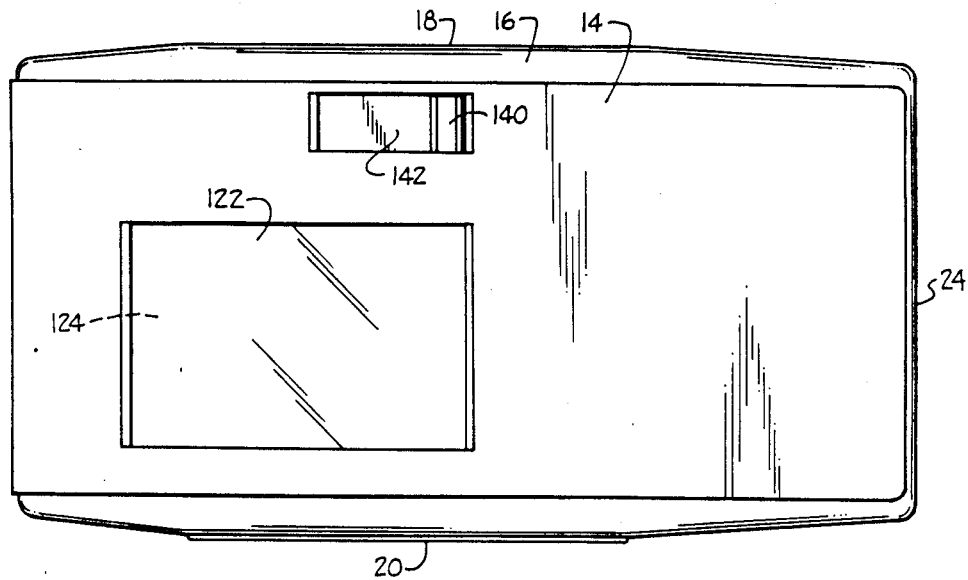
FIG. 4 is a bottom view of the camera.

Reference is now made to the drawings wherein is shown photographic apparatus in the form of a folding camera 10 of the instant or self-developing type. The camera 10 includes a first or main housing 12 having a loading door 14 (see FIG. 4) in a bottom wall 16 thereof. The first housing 12 also includes front and rear walls 18 and 20, respectively, and end walls 22 and 24. The door 14 is pivotally connected to the end wall 22 of the main housing 12 by a hinge (not shown) which is generally parallel with the axis of the camera's objective lens 28 and perpendicular to the forward and rear walls 18 and 20. The main housing 12 further includes a top wall 30 having a pair of spaced flanges 32 and 34 extending upwardly therefrom so as to define a recess 36.

Figure 1:
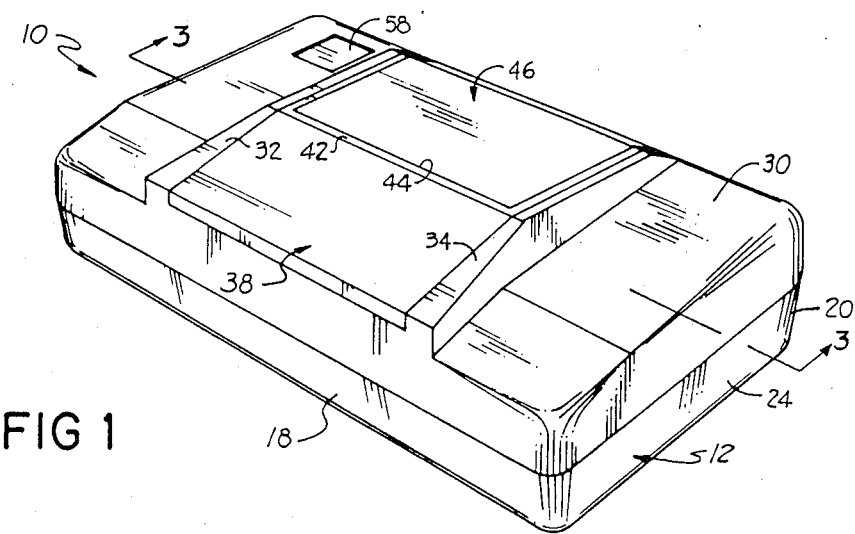
FIG. 1 is a perspective view of a folding type instant type camera which incorporates the present invention, the camera being shown in a folded condition.
Figure 2:
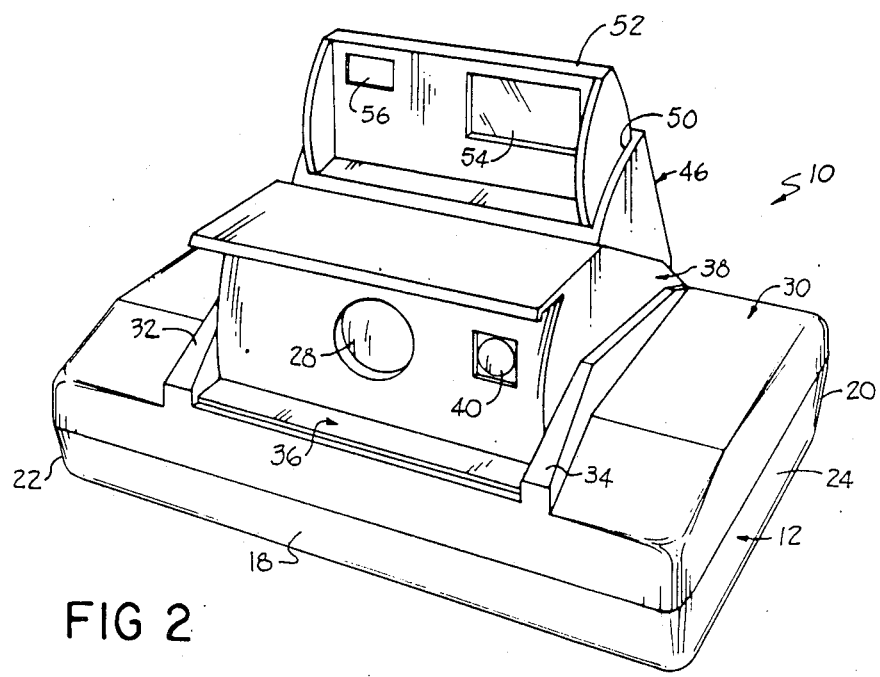
FIG. 2 is a perspective view showing the camera of FIG. 1 in an extended operative condition.

The camera 10 further includes a second housing 38 which is pivotally coupled to the first housing 12 about an axis (not shown) which is generally parallel with the rear wall 20 for movement between an inoperative position (see FIG. 1), wherein it is nested within the recess 36, and its operative position, as shown in FIG. 2. The second housing 38 supports the aforementioned objective lens 28, a shutter assembly, and a photocell window 40. A top wall 42 of the second housing 38 includes a recess 44 which is adapted to receive a third housing 46 of the camera 10 when the camera is being collapsed or folded.

The third housing 46 is pivotally coupled to the rear wall 20 of the first housing 12 about a horizontal axis (not shown) which is generally parallel with the rear wall 20. The third housing 46 is provided with a recess 50 for pivotally receiving therein a fourth housing 52.

The fourth housing 52 supports a source of artificial illumination such as a strobe 54 and an I.R. rangefinder window 56. The fourth housing 52, as well as the second and third housings 38 and 46, is biased into the erect position shown in FIG. 2. Further, the fourth housing 52 is adapted to be nested within the recess 50 prior to the third housing 46 being moved into the recess 44.

When the various housings are in the positions shown in FIG. 2, actuation of an exposure cycle initiation button 58 (see FIG. 1) located within a recess in the top wall 30 of the first housing 12 is effective to cause image bearing light rays to enter the camera 10 via the lens 28 and be reflected downwardly by a mirror (not shown) onto a film unit 62. For more specific details of the camera 10, reference may be had to our aforementioned copending application Ser. No. 866,066.

The camera 10 is adapted to receive a film assemblage of the type which includes a film cassette 60 having therein a stack of the film units 62 which is resiliently biased by a spring 64 toward a forward wall 66 of the cassette 60 so as to locate the uppermost film unit 62 adjacent to an exposure aperture 68 in the wall 66. The film units 62 are of the integral self-developing or instant type and include a rupturable pod 70 of processing liquid at their leading end and a trap 72 at their trailing end for receiving any excess processing liquid, as is well known in the art. The camera 10 includes a plate 74 for supporting the film cassette 60 in position for the sequential photographic exposure of the film units 62. The plate 74 includes an upwardly curved end section 76 for engaging a leading end wall 78 of the film cassette 60 and an upwardly standing flange 80 for engaging a trailing end wall 82 of the film cassette 60, thereby properly locating the film cassette 60 relative to the reflected optical axis of the objective lens 28.

Figure 3:
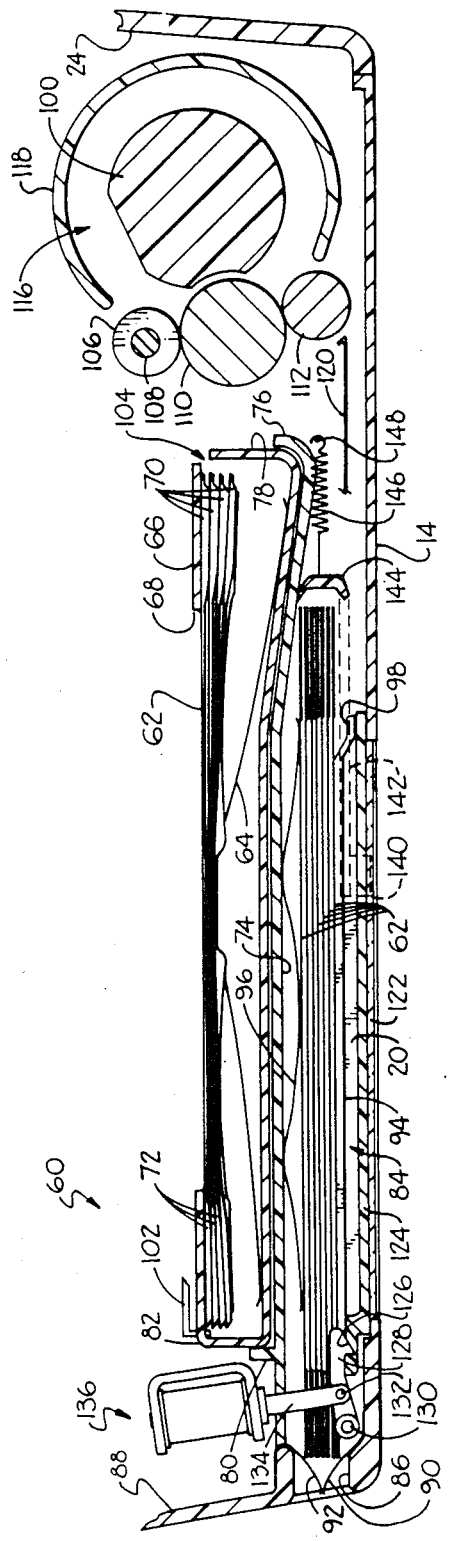
FIG. 3 is an enlarged cross sectional view, partly in section, of the camera, taken generally along the line 3—3 of FIG. 1, the upper portion of the camera being omitted for reasons of clarity.

The camera 10 also includes a lighttight imbibition chamber 84 which is defined in part by the loading door 14, the support plate 74, and the forward and rear walls 18 and 20 of the first housing 12. The imbibition chamber 84 provides a lighttight environment in which exposed film units 62 may be located during the period that the aforementioned processing liquid is being imbibed by one or more layers of the film unit 62. Exit of the film units 62 from the imbibition chamber 84 may be had by way of an egress opening 86 formed in an upturned end 88 of the loading door 14, such opening being rendered lighttight by a pair of resilient, opaque, cantilevered members 90 and 92. A flange 94 (only one shown) extends inwardly for a short distance from each of the walls 18 and 20 of the imbibition chamber 84 for supporting the lateral sides the exposed film units 62, as shown in FIG. 3. A spring 96 is mounted on the supporting wall 74 for frictionally maintaining the exposed film units in place. Each of the flanges 94 is provided with a downwardly turned portion 98 at one end thereof which functions as a ramp to guide the leading ends of the exposed film units 62 up onto the flanges 94.

Subsequent to the exposure of a film unit 62, a motor 100 is energized to drive a film advancing member 102 in a reciprocating manner to engage the exposed film unit by its trailing edge and advance the film unit toward the exterior of the film cassette 60 via an exit opening 104. As the exposed film unit 62 emerges from the film cassette 60 it enters the bite between a pair of laterally spaced cylindrically configured members (only one being shown) or friction wheels 106 mounted on the opposite ends of a roller 108 and an elongate, motor driven, roller 110. The wheels 106 engage lateral sides of the exposed film unit at areas outside its picture area, and outside of the ends of the processing liquid container 70. The friction wheels 106 and roller 110 continue the movement of the exposed film unit 62 in a first direction until its leading end is located in the bite between the roller 110 and a second elongate roller 112. The rollers 110 and 112 have a length substantially equal to the width of the exposed film unit 62. During such movement, the leading end of the exposed film unit 62 is deflected upwardly into engagement with a curved plate 118 which cooperates with the motor 100 to define an arcuate passageway 116 which guides the exposed film unit 62 around the motor 100 and redirects it in a second direction, generally opposite the first direction, into the bite of the rollers 110 and 112. Preferably, the roller 110 is driven directly by a gear train (not shown) connected to the motor 100. The gear on the roller 110 would then be used to drive the rollers 108 and 112. The rollers 110 and 112 continue the movement of the exposed film unit 62 toward the imbibition chamber 84 while simultaneously rupturing the container 70 of processing liquid located on the leading end of the film unit 62 and spreading its contents between layers of the film unit 62 to initiate the formation of a visible image within the film unit 62 via a diffusion transfer process. As the exposed film unit 62 emerges from between the rollers 110 and 112, its leading end is directed downwardly and then along a second cantilevered film advancing member 120 until it rides up the ramps 98 and partially onto the flanges 94 in the imbibition or storage chamber 84. At this point, the trailing end of the film unit 62 containing the trap 72 emerges from between the rollers 110 and 112 and snaps downwardly into a position to the left of the end of the film advancing member 120 as the exposed film unit 62 attempts to return to its original planar configuration. The film advancing member 120 is now driven by the motor 100 in a reciprocating manner so as to engage the exposed film unit 62 by its trailing edge and continue its movement up onto the flanges 94 where it will remain in a lighttight environment for a predetermined period of time until the processing liquid has been sufficiently imbibed by layers of the film unit. The predetermined period of time starts substantially at the time that the processing liquid is spread across the exposed film unit and ends when the emerging image within the exposed film unit 62 will no longer be substantially adversely affected by any ambient light which may enter the imbibition chamber 84 via a viewing window 122 located within the loading door 14. Th viewing window 122 has dimensions which generally are the same as those of the image area in the exposed film unit 62.

The viewing window 122 is generally covered in lighttight relation by an opaque blind 124 thereby maintaining the lighttightness of the imbibition chamber 84. The blind 124 is provided with an aperture 126 at one end thereof for receiving a free end of a latch 128. The latch 128 is adapted to releasably maintain the blind 124 in its operative light blocking position against the bias of a spring (not shown) which in turn is adapted to move the blind 124 into its inoperative position wherein the image in the exposed film unit 62 may be viewed. The latch 128 is pivotally coupled at 130 to a fixed portion of the camera 10 and at 132 to an arm 134 of a solenoid 136. The solenoid 136 is temporarily energized at the end of the aforementioned predetermined period of time, e.g., thirty seconds, so as to pivot the latch 128 in a counterclockwise manner, as viewed in FIG. 3, thus releasing the blind 124 for automatic movement into its inoperative position. Alternatively, the blind 124 could be provided with a manually actuated member for moving the blind 124 into its inoperative position subsequent to the actuation of the latch 128.

After the image in the exposed film unit 62 has been viewed through the uncovered window 122. The operator of the camera 10 may either leave it in the imbibition chamber and continue to photograph subjects, or remove the exposed film unit 62 for closer inspection. To remove the exposed film unit 62 from the imbibition chamber 84, the operator merely moves a button 140, to the left as viewed in FIG. 4. The bottom 140 is attached to a slide plate 142 having an inwardly turned film engaging end 144. As can be seen in FIG. 3, such movement of the film engaging end 144 is effective to move all of the film units (six being shown) from the imbibition chamber 84 via the opening 86 to a position whereat the operator may grasp them and complete their removal. A spring 146 having one end attached to the film engaging end 144 and its opposite end attached to a pin 148 extending inwardly from a wall of the imbibition chamber 84 is provided for returning the film engaging end 144 to the position shown in FIG. 3. If the operator desires to leave the exposed film units 62 within the imbibition chamber and continue photographing subjects, actuation of the exposure cycle initiation button 58 not only actuates the shutter but also completes a circuit to the motor 100. The motor 100 in turn drives the various elements described above for advancing the newly exposed film unit 62 from the cassette 60 to the bottom of the stack of film units 62 already in the imbibition chamber 84. The motor 100 also drives suitable means such as a cam (not shown) which drives the blind 124 back into latched relation with the latch 128 thereby rendering the imbibition chamber 84 lighttight.

After all of the film units 62 have been exposed and removed from the imbibition chamber 84, the empty film cassette 60 may be removed by unlatching and pivoting the loading door 14 in a clockwise manner about its hinge (not shown). As the loading door 14 is pivoted toward its open position it carries therewith among other elements, the support plate 74 carrying the film cassette 60, the second film advancing means 120, the blind 124, the solenoid 136 and the slide plate 142, end 144, spring 146 and pin 148, thereby providing easy access to the fixed structure such as the friction wheels 106 and 108 and the rollers 110 and 112.

Since certain changes may be made in the above described apparatus without departing from the scope of the invention herein involved, it is intended that all matter contained in the above description or shown in the accompanying drawings shall be interpreted as illustrative and not in a limiting sense. For example, while the present invention has been shown in a camera of the folding type it is equally as applicable to non-folding cameras. Also, the cylindrically configured members 106 may be separate independent elements rather than being interconnected by the roller 108. Still further, the storage chamber for the film units need not be lighttight if the film units are provided with their own system for preventing further exposure, such as a chemical opacifer.

What is claimed is:

1. Photographic apparatus for use with film units of the instant type comprising:
   means for supporting a film cassette containing a plurality of film units of the instant type in position for their sequential exposure;
   means for defining a storage chamber into which a film unit is adapted to be advanced subsequent to its exposure, said storage chamber being located substantially adjacent to and in underlying relation with said supporting means;

first means for advancing a film unit in a first direction, subsequent to its exposure, at least partially from the film cassette;

second means for continuing the advancement of the film unit in said first direction;

means engageable by a leading edge of the film unit, as it is being advanced in said first direction by said second means, for redirecting the film unit to a second direction generally opposite to said first direction; and third means for engaging and continuing the advancement of the film unit in said second direction toward said storage chamber prior to the film unit moving out of engagement with said second means, while simultaneously spreading a processing liquid across a layer of the film unit so as to initiate the formation of a visible image within the film unit.

2. Photographic apparatus as defined in claim 1 wherein said second means comprises a pair of laterally spaced, cylindrically configured, members for engaging lateral sides of one surface of the film unit and a roller having a length greater than the distance between said cylindrically configured members for engaging an opposite surface of the film unit.

3. Photographic apparatus as defined in claim 2 wherein said cylindrically configured members are mounted on opposite ends of a rotatable shaft.

4. Photographic apparatus as defined in claim 1 wherein said second and third means include a common element.

5. Photographic apparatus as defined in claim 4 wherein said common element comprises an elongate roller.

6. Photographic apparatus as defined in claim 5 wherein said second means comprises a pair of laterally spaced, cylindrically configured, members which in combination with said elongate roller define a passageway through which the film unit is adapted to be advanced.

7. Photographic apparatus as defined in claim 6 wherein said third means includes a second elongate roller which cooperates with said first mentioned elongate roller to spread the processing liquid across the layer of the film unit.

8. Photographic apparatus as defined in claim 1 wherein said engageable means comprises an arcuate passageway having a length less than the distance between the film unit's leading and trailing edges, whereby the film unit's leading edge is moved into contact with said third means before the film unit's trailing edge is moved out of contact with said second means.

9. Photographic apparatus for use with film units of the instant type comprising:

means for supporting a film cassette containing a plurality of film units of the instant type in position for their sequential exposure;

first means for advancing a film unit in a first direction, subsequent to its exposure, at least partially from the film cassette;

means for defining an arcuate passageway for redirecting the film unit to a second direction generally opposite said first direction; and means for moving the film unit into said arcuate passageway and withdrawing it therefrom, said moving means including means for spreading a processing liquid across a layer of the exposed film unit so as to initiate the formation of a visible image therein.

10. Photographic apparatus as defined in claim 9 further including a storage chamber for receiving the exposed film unit, said spreading means being adapted to advance the exposed film unit at least partially into said storage chamber as it spreads the processing liquid across the exposed film unit.

11. Photographic apparatus as defined in claim 9 wherein said spreading means comprises first and second rotatable means between which the exposed film unit is adapted to be moved.

12. Photographic apparatus as defined in claim 11 wherein said moving means comprises third rotatable means, said first and third rotatable means being adapted to move the exposed film unit in said first direction into said arcuate passageway, and said first and second rotatable means are adapted to move the exposed film unit in said second direction while simultaneously withdrawing it from said arcuate passageway.

13. Photographic apparatus as defined in claim 12 wherein said arcuate passageway has a length which insures that the exposed film unit will be in operative relation with said first and second rotatable means before it is moved out of contact with said first and third rotatable means.

14. Photographic apparatus as defined in claim 9 wherein said moving means includes a pair of laterally spaced, cylindrically configured, members which cooperate with said spreading means for moving the exposed film unit in said first direction.

15. Photographic apparatus as defined in claim wherein said members are adapted to engage lateral sides of the exposed film unit.

16. Photographic apparatus as defined in claim 15 wherein said members are laterally spaced from each other by an amount slightly greater than the length of a rupturable container of processing liquid carried on a leading end of the exposed film unit.

* * * * *